United States Patent Office 3,058,964
Patented Oct. 16, 1962

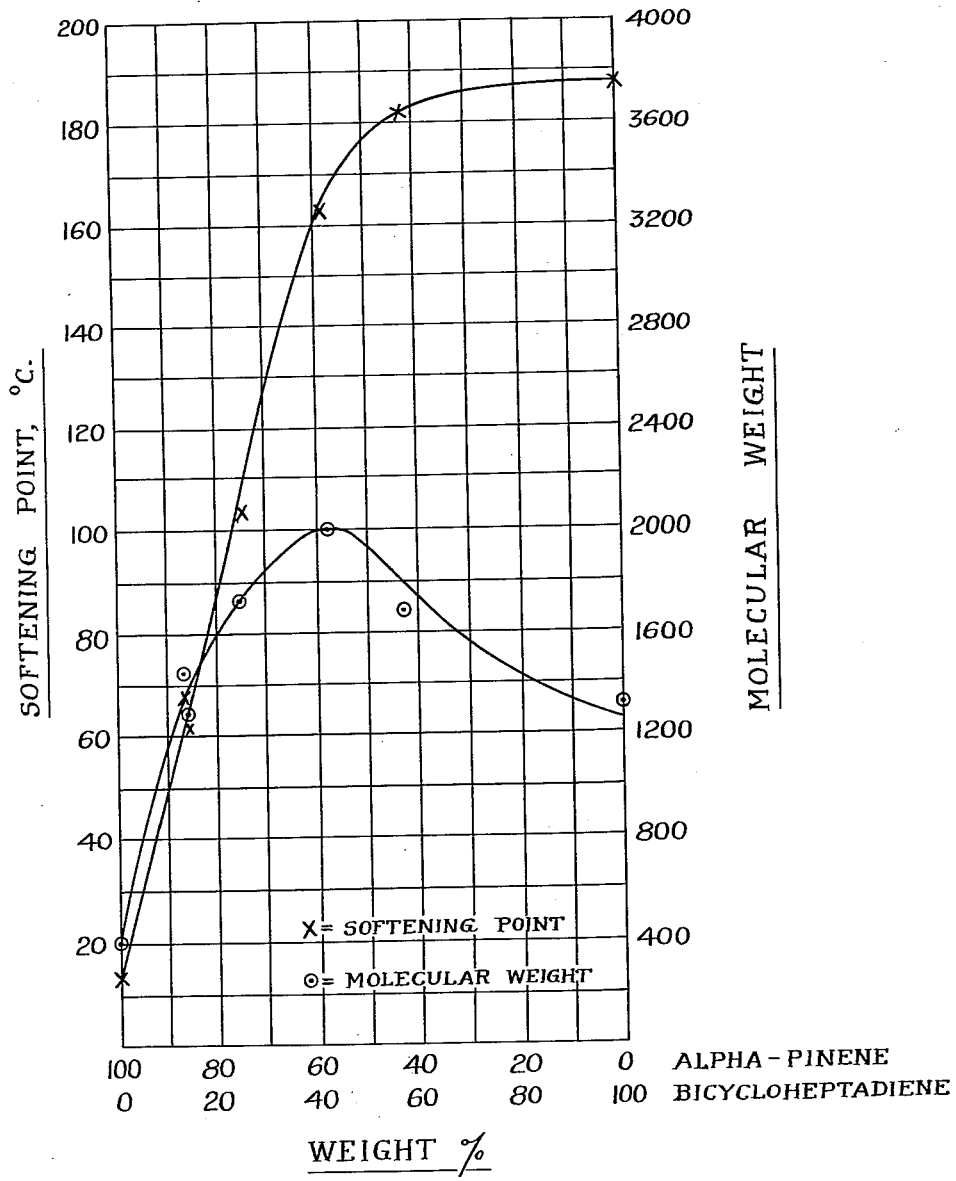

3,058,964
TERPENE CONTAINING POLYMERS
Carlos M. Samour, Wellesley Hills, Mass., assignor to The Kendall Company, Boston, Mass., a corporation of Massachusetts
Filed Aug. 11, 1959, Ser. No. 833,055
23 Claims. (Cl. 260—88.2)

This invention relates to copolymers of an endodiene bicyclo hydrocarbon and terpenes, and to a method of producing the same. More particularly, this invention relates to thermoplastic resins formed by copolymerizing a bicycloheptadiene with terpenes, and in particular to the soluble, thermoplastic resins so formed.

Polyterpene resins are noted for their characteristics of solubility, thermoplasticity and compatibility with a variety of other substances. The polyterpene resins are available in a broad range of softening points. Because of these characteristics and others, the polyterpene resins are ideally suited for a number of uses, as is well known.

The commercially available solid, thermoplastic polyterpenes are terpene homopolymers and are composed essentially of polymerized bicyclic terpenes, predominantly beta-pinene. The resin may contain other terpenes, such as alpha-pinene in addition to monocyclic and acyclic terpenes. Unfortunately, beta-pinene is not correspondingly the predominant bicyclic terpene in turpentines, the most commonly available source of terpenes for the production of homopolymeric terpene resins. Moreover, the demand for pine lumber is a serious threat to the source of supply of gum turpentine which ordinarily contains the largest proportion of beta-pinene. This is particularly unfortunate because high beta-pinene content appears to be primarily responsible for the desirable characteristics of polyterpenes, at least in the case of the higher softening point thermoplastic resins. Typical compositions of commercially available turpentines are set forth in Table I.

TABLE I

|  | Gum, percent | Refined Sulfate Wood, percent | Steam Distilled Wood, percent |
| --- | --- | --- | --- |
| Alpha-Pinene | 63 | 65 | 75 |
| Beta-Pinene | 33 | 20 | Trace |
| Dipentene | 2 | 5 | 10 |
| Other Terpenoids | 2 | 10 | 15 |

It has long been recognized that beta-pinene is the primary resin forming terpene in turpentine and that no substantial amount of solid resin is obtainable from the constituents of turpentine other than the beta- and alpha-pinenes. Curiously, these two bicyclic terpenes differ substantially in their degrees of polymerizability, even though they are closely related stereo isomers of each other.

Pure beta-pinene can be readily polymerized to give a relatively high softening point terpene resin in yields of about 85–90% and above. In contrast, pure alpha-pinene has been shown to polymerize less readily and yields only about 30% of a solid resin having a substantially lower softening point. Apparently the presence of other terpenoid materials retards or has a limiting effect upon the polymerizability of these pinenes.

As explained in U.S. Patent 2,335,912, the yield and the melting point of a solid resin from the polymerization of alpha-pinene can be increased by the enrichment of alpha-pinene with beta-pinene. According to this patent, however, the yield and melting point are merely increased approximately in accordance with the percentage inclusion of beta-pinene with the alpha-pinene; thus, the percentage yield of the solid resin obtainable by this polymerization procedure and the melting point of the resin, would still be less than the percentage yields and melting points of resins obtainable from the polymerization of pure beta-pinene.

It is obvious that the method of U.S. Patent 2,335,912 would enrich alpha-pinene with beta-pinene principally at the expense of the beta-pinene content of other beta-pinene sources. The terpene fractions depleted or reduced in beta-pinene content have to be enriched from other sources to render them suitable for polymerization into high yields of terpene resins. This is feasible so long as beta-pinene itself is plentiful. In view of the threatened diminishing supply of beta-pinene, there is a growing need for a terpene polymerization system which is not primarily dependent upon beta-pinene.

Accordingly, among the objects of this invention are thermoplastic resins formed by the copolymerization of terpenes, either in pure form or as mixtures, with an endodiene bicyclo hydrocarbon. Also included within this invention is a process of preparing resins in high yields and in a variety of softening points composed of copolymers of terpenes and an endo-diene bicyclo hydrocarbon, particularly high yields of various softening point resins wherein the terpene is predominantly alpha-pinene, or other normally difficultly polymerizable terpenes.

Surprisingly, exceptionally high yields of resins in a variety of softening points can be obtained by the copolymerization of any of the homopolymer resin-forming terpenes, either in relatively pure form, such as pure alpha-pinene, or in mixtures, such as the turpentines, with different ratios of bicycloheptadiene, which is a bicyclo hydrocarbon with the diene unsaturation within the ring structure.

The bicycloheptadiene-terpene copolymer resins of this invention are thermoplastic and generally exhibit a softening point at least equal to, and in the majority of cases, higher than the homopolymer of the terpene which may be produced by polymerizing the terpene under substantially the same conditions under which the copolymer resin is produced. The softening points of the resins prepared under approximately the same conditions are directly related to the proportion of the bicycloheptadiene copolymerized with the terpene. On the other hand, the molecular weight of the resins does not increase directly with all proportions of the bicycloheptadiene in the resin. Based upon the reaction conditions investigated and the several terpenes studied which have been copolymerized with bicycloheptadiene, it appears that resins of highest molecular weight are obtained when the bicycloheptadiene constitutes about 30–50% of the weight of the terpene and bicycloheptadiene reaction charge.

While the solid copolymer resins of bicycloheptadiene and bicyclic and/or monocyclic terpenes of this invention are thermoplastic, regardless of the proportion of bicycloheptadiene, the solubility of the resin depends upon bicycloheptadiene content. As a general proposition, it can be stated that resins of this invention which are insoluble in certain straight chain, saturated, aliphatic hydrocarbons are produced at the higher concentrations of bicycloheptadiene in the reaction charge. The concentration of bicycloheptadiene in the reaction charge at which saturated aliphatic-hydrocarbon insoluble resins in any observable quantity are produced further depends upon the particular terpene polymerized with bicycloheptadiene, and the reaction conditions. To illustrate, a relatively minor amount (about 15% by weight) of the alpha-pinene-bicycloheptadiene reaction product of Example 4, below, was insoluble in both petroleum ether and heptane, whereas no insoluble fractions were observed in the reaction products of Examples 1, 2 and 3. When reference is made to solubility of the resins, it is to be understood that solubility the same as, or similar to, the homopolymeric polyterpenes is meant. Thus, the soluble resins of this invention are soluble, as are also the polyterpenes, in such aliphatic hydrocarbons as gasoline, petroleum ether, cyclohexane, heptane, etc.; aromatic hydrocarbons such as benzene, toluene, etc.; and halogenated hydrocarbons such as methylene chloride, chloroform, tetrachloroethane, etc., to name a few.

The resins of this invention include copolymers of terpenes and bicycloheptadiene which are polyterpene-like in character, primarily with respect to the solubility, compatability, and thermoplasticity characteristics of the presently commercially available homopolymeric polyterpenes. The soluble resins of this invention are highly suitable as substitutes for the presently available polyterpenes where solubility is a necessary property for its intended end use. As will be shown, soluble resins of this invention can be made having a variety of softening points. The insoluble resins of this invention are also suitable as substitutes for the polyterpenes where the solubility of the terpenes is not important, and are particularly suitable where a high softening point thermoplastic material is required. Copending application Serial No. 838,426, filed September 8, 1959, discloses and claims pressure sensitive adhesives employing solid resins of this invention as tackifying resins.

A particularly advantageous feature of this invention which should not be overlooked is the very high yields of resins obtained by copolymerizing the various terpenes with bicycloheptadiene. This is particularly advantageous in the case of copolymers produced with alpha-pinene because the polymerization of alpha-pinene for the production of high grade, higher softening point polyterpene resins need not be done at the expense of depleting other natural terpene sources of beta-pinene. As the following examples will show, surprisingly high yields of the resins of this invention are obtainable even with substantially pure alpha-pinene.

*Examples 1–14*

The resins produced and the conditions of the reactions are summarized in Table II below. In each of Examples 1 and 3–14 the particular terpene, or mixture of terpenes, and bicycloheptadiene (bicyclo-(2.2.1)-2,5-heptadiene) were dissolved in the stated proportions in the solvent in a suitable reaction vessel and the catalyst was added in small amounts over a period of time under an inert atmosphere. In Example 2, the alpha-pinene was dissolved in the solvent in the reaction vessel and the bicycloheptadiene and catalyst were added in incremental amounts under an inert atmosphere. In all instances the inert atmosphere was nitrogen. The temperature, where necessary, was controlled by a heat abstracting means. In some instances, usually after all signs of a reaction had ceased, the reactants were heated. The time of the reaction for each of the examples set forth in Table II was measured from the time of the first addition of the catalyst to about the time the resulting reaction mixture was treated for separation of the resins therefrom.

When appropriate, the resulting reaction mixtures were cooled to room temperature, or below, preparatory to separation of the resin reaction products. In Examples 1–6, 12 and 13, the resulting reaction mixtures were decomposed with either a dilute aqueous solution of hydrochloric acid or a dilute aqueous solution of sodium hydroxide, and then, in a majority of the cases, washed with additional solvent before separation of the solvent layer from the reaction mixture. The separated solvent layer was then dried and the resin recovered therefrom by removal of the solvent by vacuum distillation. The reaction mixtures of Examples 7 and 14 were decomposed by additions of isopropanol and water, and the reaction mixture of Example 8 was decomposed by additions of isopropanol, butanol, and water. The benzene layer was separated. The resin was precipitated from the separated benzene layer of Example 7 by additions of ethanol and methanol, and from the separated benzene layers of Examples 8 and 14 by the addition of methanol. The precipitated resins were separated therefrom by filtration and washed with methanol. The reaction mixtures of each of Examples 9, 10 and 11, wherein boron trifluoride was employed as the catalyst, were decomposed by the addition of water. The resins were recovered therefrom by separation of the benzene layer, precipitating the resin from the benzene layer by the addition of methanol, filtering the precipitated resin therefrom, and washing with methanol.

The resins of all of the examples were heated to dryness under vacuum and elevated temperature. The softening points and molecular weights of these resins and the yields in which they were obtained are set forth in Table II.

Referring to Table II, BCH designates bicycloheptadiene. The alpha-pinene of the examples is a commercial material comprising 85% alpha-pinene, 12% camphene, and 3% of a mixture of dipentene and other monocyclic terpenes. SDWT designates steam distilled wood turpentine comprising approximately 85% alpha-pinene, 5% of a mixture of bicyclic terpenes, including camphene, and 15% of monocyclic terpenes in admixture with a minor amount of p-methane and p-cymene. GT designates spirits of pure gum turpentine, commercial grade, composed principally of a mixture of alpha- and beta-pinenes in about a 70:30 ratio. Beta-pinene is a commercial grade of a sulphate beta-pinene composed predominantly of beta-pinene and relatively minor amounts of other turpenoid materials. Dipentene is a commercial grade of dipentene composed of 51% dipentene, 18% of other terpenes, 17% of p-cymene and 14% of p-menthane.

The homopolymers of Examples A and B were produced

TABLE II

| Ex. | Terpene | Weight Percent in Reaction Mixture | | Solvent | Catalyst | Time of Reaction, Hrs. | Temp. of Reaction, °C. | Percent Yield | Softening Point, °C. | Molecular Weight |
|---|---|---|---|---|---|---|---|---|---|---|
| | | Percent Terpene | Percent BCH | | | | | | | |
| A | Alpha-Pinene | 100 | | Benzene | AlCl₃ | 3 | 25–60 | | <20 | 420 |
| B | | | 100 | do | AlCl₃ | 24 | 25–70 | 74.4 | 187 | 1,340 |
| 1 | Alpha-Pinene | 85.6 | 14.4 | do | AlCl₃ | 3 | 9–65 | 89.0 | 61 | 1,300 |
| 2 | do | 85.9 | 14.1 | do | AlCl₃ | 4½ | 0–60 | 91.5 | 67 | 1,430 |
| 3 | do | 58.0 | 42.0 | do | AlCl₃ | 6 | 6–65 | 97.6 | 163 | 2,000 |
| 4 | do | 42.5 | 57.5 | do | AlCl₃ | 2⅔ | 3–65 | 100 | 182 | 1,680 |
| 5 | SDWT | 74.7 | 25.3 | CHCl₃ | AlCl₃ | 4 | 5–60 | 96.0 | 103 | 1,710 |
| 6 | GT | 93 | 7 | Toluene | AlCl₃/TiCl₃ | 3 | 28.2–58 | 99.2 | 43 | 940 |
| 7 | GT | 74.8 | 25.2 | Benzene | AlCl₃ | 6 | 8.5–44 | 86.1 | 143 | 2,100 |
| 8 | GT | 59.9 | 40.1 | do | AlCl₃ | 6 | –8–40 | 95.5 | 179 | 3,100 |
| 9 | GT | 59.6 | 40.4 | do | BF₃ | 2 | 5–28 | 92.5 | 158 | 1,000 |
| 10 | Alpha-Pinene | 59.6 | 40.4 | do | BF₃ | 3 | 10–20 | 90.4 | 113 | 840 |
| 11 | Beta-Pinene | 73.9 | 26.1 | do | BF₃ | 2¼ | 7–20 | 86.4 | 116 | 1,180 |
| 12 | do | 59.6 | 40.4 | do | AlCl₃ | 4 | 5.5–50 | 100 | 158 | 2,200 |
| 13 | Dipentene | 59.6 | 40.4 | do | AlCl₃ | 4¾ | 4.2–50 | 89.1 | 132 | 880 |
| 14 | do | 81.0 | 19.0 | do | AlCl₃ | 3 | 5–42 | 80 | 130 | 850 | following the procedure described above for Example 1 and under the conditions designated in Table II. The low softening point of the reaction product of Example A probably may be accounted for by the presence of low molecular weight polymer fractions, such as the dipolymer, which are produced during the polymerization of alpha-pinene.

All of the copolymer resins of Examples 1–14 and the homopolymer resins of Examples A and B are thermoplastic. The alpha-pinene homopolymer resin of Example A is soluble in aliphatic, aromatic and chlorinated hydrocarbon solvents as are also the copolymer resins of Examples 1–14, except for a minor amount of the reaction product of Example 4, which was insoluble to the extent previously explained. The homopolymer bicycloheptadiene resin of Example B is insoluble in aliphatic hydrocarons, such as heptane and petroleum ether.

The resins were obtained in surprisingly high yields, particularly in the case of the bicycloheptadiene-alpha-pinene copolymer resins. In contrast, the yield of a solid homopolymer of alpha-pinene is relatively low, as is well known.

The softening points and molecular weights of the resins of this invention are related to the terpene:bicycloheptadiene ratio. These relationships are graphically illustrated in the drawing in which the softening points and molecular weights of the resins of Examples 1 to 5 are plotted as a function of the terpene:bicycloheptadiene weight ratios. As shown therein, the softening point of the resin varies directly in proportion to the bicycloheptadiene content. Even relatively small amounts of the bicycloheptadiene produces an increase in the softening point of the copolymer resins over that of the homopolymer of alpha-pinene. Resins approaching a maximum softening point are obtained at terpene:bicycloheptadiene weight ratio of about 50:50. As previously stated, high molecular weight resins are obtained when the bicycloheptadiene constitutes about 30–50% of the terepene/bicycloheptadiene reaction charge; as shown in the graph, a maximum molecular weight occurs with an alpha-pinene:bicycloheptadiene ratio of about 60:40 under the reaction conditions specified. Resins of substantially the same molecular weight can be prepared which differ substantially in softening point.

The relative proportions of the bicycloheptadiene to the terpenes may be varied over a wide range. If the main purpose is to form resins from the otherwise difficultly polymerizable terpenes in high yields, or even from isolated beta-pinene, then only minor amounts of the bicycloheptadiene will suffice. If resins having higher softening points are desired, then larger amounts of bicycloheptadiene should be employed. If the purpose is to produce the highest softening point thermoplastic resins possible, but having solubility characteristics similar to the commercially available polyterpene resins, then the amount of the bicycloheptadiene copolymerized with the terpene can be increased up to the point at which aliphatic-hydrocarbon insoluble fractions are produced. Generally, at least about 25%, by weight, of the terpene should be employed for this purpose. Ordinarily, if the amount of the bicycloheptadiene exceeds about 90% by weight of the bicycloheptadiene/terpene reaction mixture substantial fractions of the resin reaction product are insoluble in certain straight chain saturated aliphatic hydrocarbons. It is readily apparent that it is possible to predetermine the characteristics of softening point, molecular weight and solubility of the resins of this invention by proper proportioning of the bicycloheptadiene and terpene, by proper choice of the terpene or terpene-mixture, and also by a proper choice of the reaction conditions.

Aside from the ratio of the bicycloheptadiene to any given terpene components of the reaction mixture, the nature of the resins formed and the yield of the resins is influenced by such factors as temperature, solvent, if any, and type of catalyst employed in the reactions. A wide range of temperatures may be employed; for example, the temperature may vary from about −50° C. to as high as 200° C., although the preferred temperature range is from about −10° C. to 70° C. The copolymerization reaction of this invention is conducted preferably but not necessarily in the presence of an inert, organic solvent. In some instances it may be beneficial to conduct the polymerization or initiate the polymerization in the absence of solvents for the purpose of producing resins of higher softening points or molecular weights. An alpha-pinene/bicycloheptadiene polymer of this invention was produced by adding the aluminum chloride catalyst to a solvent-free mixture of about 58% alpha-pinene and about 42% bicycloheptadiene. The reaction was exothermic and the reaction mixture solidified on standing. The solidified mass was dissolved in dry benzene with the evolution of heat. An additional amount of the catalyst was added. Further addition of catalyst did not cause heat evolution. After heating at about 55° C. for 20 minutes the reaction mixture was cooled and poured into a dilute aqueous solution of hydrochloric acid. The resin was recovered therefrom by separating the benzene layer, drying, and then removing the benzene by vacuum distillation. The resin had a softening point of about 170° C. and a molecular weight of about 2,560. In comparison, the resin of Example 3 which was polymerized entirely in the presence of solvent and which also was formed from a mixture of about 58% alpha-pinene and about 42% bicycloheptadiene had a softening point of 163° C. and a molecular weight of 2000.

Suitable solvents, among others, which may be used are saturated aliphatic hydrocarbons, such as gasoline, petroleum ether, cyclohexane, and heptane; aromatic hydrocarbons and alkyl derivatives thereof, such as benzene and toluene; and halogenated hydrocarbons, such as methyl chloride, methylene chloride, chloroform, and tetrachloroethane, to list a representative few. Not all of the solvents may be entirely equivalent in all systems of the reactions of this invention; for example, the polymerization of mixtures of bicycloheptadiene and gum turpentine using toluene as the solvent and boron trifluoride as the catalyst were conducted at −50° C., −20° C., 0° C., and above room temperature, yielding resins which had low molecular weights and softening points. To specifically illustrate, a mixture consisting of gum turpentine and bicycloheptadiene in a weight ratio about the same as in Example 9, polymerized in the temperature range of 25–47° C. in the presence of toluene as the solvent and boron trifluoride, yielded a solid resin exhibiting a molecular weight of about 400 and a softening point at about room temperature. Substitution of benzene for toluene resulted in the formation of a higher softening point and higher molecular weight resin, as exemplified by the resin of Example 9.

The copolymerization is conducted by contacting the terpenes and bicycloheptadiene with a Lewis acid catalyst. These catalysts include the Friedel-Crafts catalysts which are halides of polyvalent metals such as $AlCl_3$, $SnCl_4$, $BF_3$ and $ZnCl_2$. The activity of these catalysts varies considerably. The aluminum chloride and boron trifluoride catalysts appear to be the most active of the catalysts investigated. However, the softening points and molecular weights of the resins produced using boron trifluoride as the catalyst were usually lower than those produced using aluminum chloride as the catalyst, other conditions being generally the same. Other Lewis acid catalysts may be employed, providing that the reaction conditions are suitable for the particular type catalyst to produce the resins of this invention.

The polymerization reaction may be carried out in any suitable reaction vessel. The ingredients to be reacted may be combined and brought into contact with the catalyst material in any convenient manner. Perhaps most conveniently, the terpene and bicycloheptadiene may be premixed in a reaction vessel, preferably with a suitable solvent. The catalyst may then be added at such a rate as to keep the reaction temperature between the desired limits. Alternatively the solvent and catalyst can be placed in the reaction vessel first and then the terpene and bicycloheptadiene added. As a further illustration, the terpene and the solvent may be placed in a reaction vessel and then combined with the bicycloheptadiene and the catalyst. In such instance the catalyst and bicycloheptadiene may be intermittently added over a period of time, as Example 2, for controlling the homogeneity of the product formed where small amounts of terpene or bicycloheptadiene are used.

The reaction products may be isolated and purified according to methods well known in the art for purifying terpene resins. For example, after the reaction is complete the reaction mixture may be treated with dilute alkali or dilute acid and then washed with water to remove all traces of acid and alkali. Traces of catalyst may be removed by treatment with a suitable absorbent material such as activated carbon. The solvent and any remaining unreacted constituents may be removed by conventional vacuum or steam distillation.

The softening points of the resins of Examples A, B and 1–14 were determined using a Dennis melting point apparatus (model MP. 11), with the temperatures being measured by the use of a pyrometer. Samples of the resins were finely powdered and sprinkled across the bar of the apparatus in a narrow train within the softening region of the bar. The temperature recorded is the temperature at which the sample began to soften and adhere to the bar. The molecular weights of the resins are cryoscopic molecular weights using bromoform or benzene as the solvent.

As disclosed and claimed in said aforementioned copending application, resins of this invention may be employed as tackifier resins in pressure-sensitive adhesives. Surprisingly, in view of the non-tackifying properties of homopolymeric bicycloheptadiene, copolymeric terpene-bicycloheptadiene resins containing even a predominantly major proportion of bicycloheptadiene, are suitable as tackifier resins. A particularly surprising phenomenon is that a resin of this invention having a terpene:bicycloheptadiene molar ratio of 1:1 is a better tackifier resin in conventional pressure-sensitive adhesive formulations than a terpenebicycloheptadiene resin having a higher terpene ratio, for a given terpene or mixture of terpenes. The exact maximum amount of bicycloheptadiene which may be copolymerized with a terpene or mixture thereof to obtain resins having effective adhesion- and tack-imparting properties when in combination with rubbery elastomers, which provide a cohesive, elastic, flexible base for the adhesives, will depend primarily upon the type of terpene, or mixture thereof, for any given set of polymerizing conditions. Based upon the studies of the tackifier properties of these copolymer resins, it may be stated in some generality that the ratio, on a molar basis, of terpene to bicycloheptadiene should not be less than 1:9; preferably, the terpene:bicycloheptadiene molar ratio should be within the range of about 9:1 to 1:4. At one extreme, only very minor amounts of bicycloheptadiene copolymerized with a terpene produces a copolymer resin of significant tackifier properties. At the other extreme, the variety of polymerizable terpenes which may be copolymerized with bicycloheptadiene, the complexity of polymer resin chemistry, and the complexity of the chemistry of pressure-sensitive adhesives, permits only a qualified generalization that the minimum amount of terpene must be an amount effective to produce a tackifier resin when copolymerized with bicycloheptadiene.

Since various embodiments may be made of this invention, and many changes can be made based on the foregoing description, it is to be understood that the description is to be interpreted as illustrative and the claims to include such embodiments and changes.

What is claimed is:

1. A copolymer of a bicyclo-(2.2.1)-2,5-heptadiene and a $C_{10}H_{16}$ terpene.

2. A copolymer in accordance with claim 1 wherein said terpene is predominantly alpha-pinene.

3. A thermoplastic resin comprising a copolymer of bicyclo-(2.2.1)-2,5-heptadiene and a terpene, said terpene comprising at least one $C_{10}H_{16}$ terpene selected from the group consisting of monocyclic and bicyclic $C_{10}H_{16}$ terpenes.

4. A thermoplastic resin comprising a copolymer of bicyclo-(2.2.1)-2,5-heptadiene and $C_{10}H_{16}$ terpene, said terpene comprising predominantly alpha-pinene.

5. A thermoplastic resin comprising a copolymer of bicyclo-(2.2.1)-2,5-heptadiene and a bicyclic $C_{10}H_{16}$ terpene.

6. A thermoplastic resin comprising a copolymer of bicyclo-(2.2.1)-2,5-heptadiene and alpha-pinene.

7. A thermoplastic resin comprising a copolymer of bicyclo-(2.2.1)-2,5-heptadiene and beta-pinene.

8. A thermosplatic resin comprising a copolymer of bicyclo-(2.2.1)-2,5-heptadiene and turpentine.

9. A thermoplastic resin comprising a copolymer of bicyclo-(2.2.1)-2,5-heptadiene and a monocyclic $C_{10}H_{16}$ terpene.

10. A soluble thermoplastic resin comprising a copolymer formed by copolymerizing a mixture of bicyclo-(2.2.1)-2,5-heptadiene and a $C_{10}H_{16}$ terpene, said mixture containing at least about 25%, by weight, of said terpene, based on the weight of said mixture.

11. A soluble thermoplastic resin comprising a copolymer formed by copolymerizing a mixture of bicyclo-(2.2.1)-2,5-heptadiene and a bicyclic $C_{10}H_{16}$ terpene, said mixture containing at least about 25%, by weight, of said terpene, based on the weight of said mixture.

12. A soluble thermoplastic resin comprising a copolymer formed by copolymerizing a mixture of bicyclo-(2.2.1)-2,5-heptadiene and alpha-pinene, said mixture containing at least about 25%, by weight, of said alpha-pinene, based on the weight of said mixture.

13. A soluble thermoplastic resin comprising a copolymer formed by copolymerizing a mixture of bicyclo-(2.2.1)-2,5-heptadiene and beta-pinene, said mixture containing at least about 25%, by weight, of beta-pinene, based on the weight of said mixture.

14. A soluble thermoplastic resin comprising a copolymer formed by copolymerizing a mixture of bicyclo-(2.2.1)-2,5-heptadiene and turpentine, said mixture containing at least about 25%, by weight, of said turpentine based on the weight of said mixture.

15. A soluble thermoplastic resin comprising a copolymer formed by copolymerizing a mixture of bicyclo-(2.2.1)-2,5-heptadiene and monocyclic $C_{10}H_{16}$ terpene, said mixture containing at least about 25%, by weight, of said terpene, based on the weight of said mixture.

16. The process of forming a copolymer of a bicyclo-(2.2.1)-2,5-heptadiene and a terpene comprising treating a mixture of said bicycloheptadiene and terpene in the presence of a Friedel-Crafts catalyst, said terpene comprising at least one $C_{10}H_{16}$ terpene selected from the group consisting of monocyclic and bicyclic $C_{10}H_{16}$ terpenes.

17. The process of forming a copolymer of bicyclo-(2.2.1)-2,5-heptadiene and a bicyclic $C_{10}H_{16}$ terpene comprising treating a mixture of said bicycloheptadiene and terpene in the presence of a Friedel-Crafts catalyst at a temperature of about −10° C. to 70° C.

18. The process of forming a thermoplastic resin comprising treating a mixture of bicyclo-(2.2.1)-2,5-heptadiene and a monocyclic $C_{10}H_{16}$ terpene at a temperature of about −10° C. to 70° C. in the presence of a Friedel-Crafts catalyst.

19. The process of forming a copolymer of a bicyclo- (2.2.1)-2,5-heptadiene and at least one $C_{10}H_{16}$ terpene comprising treating a mixture of said bicycloheptadiene and terpene in the presence of a Friedel-Crafts catalyst.

20. A thermoplastic resin comprising a copolymer of terpene and bicyclo-(2.2.1)-2,5-heptadiene in a molar ratio, respectively, within the range of about 9:1 to 1:9, said terpene comprising at least one $C_{10}H_{16}$ terpene selected from the group consisting of monocyclic and bicyclic $C_{10}H_{16}$ terpenes.

21. A thermoplastic resin comprising a copolymer of terpene and bicyclo-(2.2.1)-2,5-heptadiene in a molar ratio, respectively, within the range of about 9:1 to 1:4, said terpene comprising at least one $C_{10}H_{16}$ terpene selected from the group consisting of monocyclic and bicyclic $C_{10}H_{16}$ terpenes.

22. A material comprising a copolymer of a bicyclo-(2.2.1)-2,5-heptadiene and at least one $C_{10}H_{16}$ terpene, said bicycloheptadiene constituting up to about 90% by weight of the terpene and bicycloheptadiene.

23. A material comprising a copolymer of a bicyclo-(2.2.1)-2,5-heptadiene and a terpene, said terpene comprising at least one $C_{10}H_{16}$ terpene selected from the group consisting of alpha-pinene and beta-pinene.

References Cited in the file of this patent

UNITED STATES PATENTS

| | | |
|---|---|---|
| 2,348,565 | Ott | May 9, 1944 |
| 2,930,781 | Schmerling | Mar. 29, 1960 |
| 2,930,782 | Schmerling | Mar. 29, 1960 |

FOREIGN PATENTS

| | | |
|---|---|---|
| 154,903 | Australia | Jan. 26, 1954 |

OTHER REFERENCES

Noller: "Chemistry of Organic Compounds," 2nd edition (1957), W. B. Saunders Co., Philadelphia (page 850 pertinent).